United States Patent
Yang et al.

(10) Patent No.: US 8,176,453 B2
(45) Date of Patent: May 8, 2012

(54) POWER-AWARE DEBUGGING

(75) Inventors: Kai Yang, San Jose, CA (US); Tayung Liu, Sunnyvale, CA (US); Furshing Tsai, San Jose, CA (US); Ting Shih Ang, Hsinchu (TW); Chih Neng Hsu, Zu-Dong Township (TW); Jun Zhao, Pleasanton, CA (US)

(73) Assignee: Springsoft USA, Inc., San Jose, CA (US)

( * ) Notice: Subject to any disclaimer, the term of this patent is extended or adjusted under 35 U.S.C. 154(b) by 356 days.

(21) Appl. No.: 12/558,259

(22) Filed: Sep. 11, 2009

(65) Prior Publication Data
US 2010/0192115 A1 Jul. 29, 2010

Related U.S. Application Data

(60) Provisional application No. 61/146,895, filed on Jan. 23, 2009.

(51) Int. Cl.
*G06F 17/50* (2006.01)
(52) U.S. Cl. ........ 716/106; 716/109; 716/112; 716/129; 716/133
(58) Field of Classification Search .................... 716/56, 716/104, 106, 109, 110, 112, 127, 133
See application file for complete search history.

(56) References Cited

U.S. PATENT DOCUMENTS

| | | | |
|---|---|---|---|
| 6,826,607 B1 * | 11/2004 | Gelvin et al. | 709/224 |
| 6,832,251 B1 * | 12/2004 | Gelvin et al. | 709/224 |
| 6,934,532 B2 * | 8/2005 | Coppinger et al. | 455/412.1 |
| 7,020,701 B1 * | 3/2006 | Gelvin et al. | 709/224 |
| 7,203,485 B2 * | 4/2007 | Coppinger et al. | 455/418 |
| 7,844,687 B1 * | 11/2010 | Gelvin et al. | 709/220 |
| 7,962,137 B2 * | 6/2011 | Coppinger et al. | 455/435.2 |

* cited by examiner

*Primary Examiner* — Sun Lin
(74) *Attorney, Agent, or Firm* — Chernoff, Vilhauer, McClung & Stenzel

(57) ABSTRACT

A debugging system produces displays in response to an IC design and results of a logic simulation of IC behavior based on the IC design. The IC design includes a hardware description language (HDL) model of the IC describing the IC as comprising cell instances communicating via data signals and power sources for supplying power to the cell instances. The IC design also includes power definition markup language (PDML) model describing a power intent of the IC design. The debugging system generates displays representing HDL code that are annotated to indicate how the power intent of the IC design described by the PDML model relates to the portion of the HDL model represented by the display. The debugging system also generates signals trace displays indicating how both the logic and power intent of the IC design affect the value of a user-selected signal at a user-selected time during the logic simulation.

19 Claims, 7 Drawing Sheets

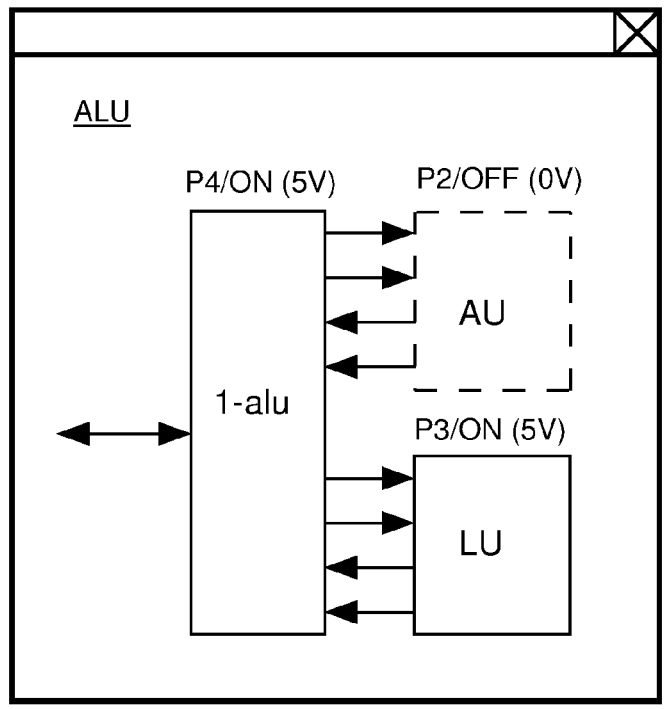
FIG. 5
| my_pst | | 365 ns | | | 82 |
|---|---|---|---|---|---|
|  | P1/vdd1 | P2/vdd2 | P3/vdd3 | P4/vdd4 | P5/vdd5 |
| PM1 | 5V | 5V | 5V | 5V | 3.6V |
| PM2 | 3.6V | OFF | 5V | OFF/5v | 3.6V |
| PM3 | 3.6V | OFF | OFF | OFF | 3.6V |
| PM4 | 3.6V | 5V | 5V | 5V | OFF |
FIG. 6
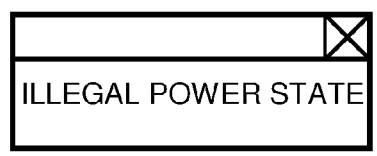
FIG. 7

POWER-AWARE DEBUGGING

CROSS-REFERENCE TO RELATED APPLICATION

This application claims benefit under 35 USC 119(e) of Provisional Application No. 61/146,895 filed Jan. 23, 2009, the entire disclosure of which is hereby incorporated by reference herein for all purposes.

BACKGROUND OF THE INVENTION

1. Field of the Invention

The invention relates in general to systems for verifying integrated circuit (IC) designs, and in particular to a system for debugging power-aware IC designs.

2. Description of Related Art

An IC that is not designed to conserve power can use up to ten times more power than an IC of similar capability that is designed to conserve power. Low-power design not only increases the battery usage for mobile devices but also improves system reliability and lowers the cost of packaging. Low-power techniques such as clock-gating, gate-optimization, multi-VDD, and multi-threshold have been studied for decades and been proved to be effective at reducing dynamic power consumption. However, as manufacturing processes continue to advance, leakage power consumption has begun to play a more critical role in power consumption. Power management (PM) techniques such as power-shutoff (PSO), and dynamic voltage frequency scaling (DVFS), multi-voltage design, and power aware memories can be more effective to reduce both dynamic and leakage power consumption.

Power Shutoff (PSO), also called "power gating", involves temporarily shutting down a section of an IC not currently in use to halt power dissipation in that section. An IC designer partitions an IC into several "power domains" (or "power islands"), each power domain having a separate primary power supply. The power supply to a "gated" power domain can be turned off so that the devices in that power domain do not consume power when they are not needed. Before switching off the supply to a gated power domain, it may be necessary to store data indicating states of various signals within that domain so the stored data can be used for resetting devices within that domain to their last states when the domain's power is restored. An IC may therefore include memory devices ("retention cells") to store such data while a gated power domain's supply is off. A gated power domain may also require "isolation cells" to isolate one or more of the domain's output ports from the external environment when the domain's power is off to prevent those output ports from supplying floating inputs to devices in active power domains that can drive those devices to unexpected states. An IC having gated power domains will include a special controller for turning on and off gated power domains under appropriate conditions and for controlling each domain's retention and isolation cells.

A multi-voltage IC is organized into various "voltage domains" that receive differing supply voltages. Since both the speed and power dissipation of a circuit device increase with its supply voltage, devices that must work at high speed receive the full supply voltage while devices that can operate more slowly can operate at reduced voltages. Supplying each device with only the voltage it needs reduces overall power consumption. A multi-voltage design employs special buffers ("level-shifters") to shift logic levels of signals crossing voltage domain boundaries. A multi-voltage IC may employ dynamic Voltage and Frequency Scaling (DVFS), also known simply as Dynamic Voltage Scaling (DVS), a technique for temporarily reducing both the voltage and clock frequency of devices within a voltage domain in order to reduce energy consumption when high-speed operation is not needed. In such cases, the IC's power controller must be able to signal the domains level-shifters to accommodate the changes in supply voltage.

Power Definition Markup Language

Since adding power gating, multi-voltage domains or dynamic voltage and frequency scaling late in the design process, at a low gate level of abstraction, can introduce unanticipated bugs in the design, an IC designer should try to plan power management at the register-transfer-level (RTL) or earlier architecture stage of the IC design process.

Although designers typically employ a hardware description language (HDL) to describe an IC design, HDL lacks the capability to model power management. Designers now use Power Definition Markup Languages (PDML) to compensate the lack of power modeling capability in HDL. PDML enables a designer to incorporate a design's "power-intent" into each level of design abstraction by specifying power and DVFS domains, by indicating signals requiring state retention, isolation and level shifting, and by specifying the manner in which such power management devices are to be controlled.

PDML focuses only on the power related aspects of a design by inferring a virtual power network that is parallel to the HDL design and working in tandem with it, but which is not a part of the HDL design itself. Hence it is not necessary to modify an HDL language description of an IC to provide power-aware capability to a circuit design. PDML models can overlay power-aware behaviors onto an HDL design and allow verification systems to verify those behaviors. Thus PDML provides a high-level abstract model of the intended power management behavior for use when the IC design is at a high level of abstraction, and it also allows a designer to subsequently match the specified behavior to devices implementing that power behavior$_{[k1]}$ Verification An IC designer can compile an HDL/PDML design and various instructions into a testbench program for a logic simulator that simulates the response of the IC to a specified input signal pattern. The simulator generates and stores value change data representing the behavior of selected circuit signals so that the designer, employing a debugging tool processing the value change data, can determine whether an IC constructed in accordance with the HDL design will behave as expected. A debugging tool can display waveforms representing signal behavior, HDL code, and schematic diagrams representing the HDL design and can annotate the waveform, code and schematic diagram displays to relate signal behavior to portions of the HDL design that are responsible for that signal behavior.

A conventional logic simulator can take into account a PDML model of the IC when it simulates and HDL design by connecting the PDML model to clock, reset, power on/off and other power control signals of the HDL design. Those signals tell the PDML model when to trigger power-aware behavior by telling the simulator when to change normal RTL behavior to reflect results of power control network activity. For example, if a power domain is shutoff at a particular time during a logic simulation, the PDML model will tell the HDL simulator to cancel all events within that power domain and force values of signals within that domain as "unknown". Thus an HDL simulator can impose the power intent specified by the PDML description on the circuit behavior of the HDL design during a logic simulation run thereby allowing a designer to verify whether the simulated IC behavior satisfies the specified power intent.

Even though a simulator can take into account the power intent of a PDML when simulating IC behavior, it can be difficult and time-consuming for a designer to debug an HDL design having associated PDML power-intent. When employing a conventional debugging tool to debug an HDL design, the designer loads the HDL design and the logic simulation output data into the debugging tool and then uses the debugging tool to trace through the design to determine why various signals may take on unexpected values at various times during the logic simulation. Since traditional debugging tools don't take the PDML aspects of a design into consideration, designers must manually cross reference the HDL and PDML designs to determine whether an unexpected signal value is caused by a defect in the HDL design or by PDML introduced effects. Debugging an HDL/PDML design can therefore be tedious and error-prone, particularly when the HDL and PDML aspects of a design are developed by different design teams at different stages of the design process.

What is needed is a debugging tool that takes the PDML portion of an HDL/PDML design into account to make it easier for a designer to determine the causes of unexpected circuit behavior.

The present invention relates to an automated power-aware debugging system for a hardware description language (HDL) integrated circuit design having a corresponding power-intent described in a Power Definition Markup Language (PDML).

SUMMARY OF THE INVENTION

A debugging system in accordance with the invention produces displays in response to an IC design and results of a logic simulation of IC behavior based on the IC design.

The IC design includes a hardware description language (HDL) model of the IC describing the IC as being formed by a set of cell instances communicating via data signals and a set of power sources for supplying power to the cell instances. The IC design also includes power definition markup language (PDML) model describing a power intent of the IC design by indicating which power sources can be turned on and off or have output voltages that can vary during IC operation and by indicating which data signals are subject to level-shifting, isolation or retention.

The debugging system generates a display representing HDL code that is annotated to indicate how the power intent of the IC design described by the PDML model relates to the portion of the HDL model represented by the display. Displayed code referencing any data signal is annotated to indicate whether the data signal is subject to retention, isolation or level-shifting and to indicate whether the data signal was saved, restored or isolated at a user-selected time.

The debugging system also generates a signal trace display indicating how both the logic and power intent of the IC design affect the value of a user-selected signal at a user-selected time during the logic simulation. The trace display includes representations of cell instances and data signals that can influence the value of the user-selected data signal, representations of power supplies supplying power to the represented cell instances and representations of retention, isolation and level-shifting cells that can influence the value of the user-selected data signal. The power supply representations are annotated to represent their on/off states and output signal voltages at the user-selected simulation time. The retention and isolation cell instance representations are annotated to indicate the operating modes at the user selected simulation time.

The debugger also generates a display describing a set of legal power intent states of the IC described by the PDML code, identifying the legal power state of the IC, if any, at the user-selected simulation time, and providing a warning when the IC is an illegal power state at the user-selected simulation time.

BRIEF DESCRIPTION OF THE DRAWINGS

In the drawings:

FIGS. 4-7 graphically depict displays in accordance with the invention produced by the power-aware debugger of FIG. 3.

DETAILED DESCRIPTION OF THE INVENTION

Figures 1, 2:
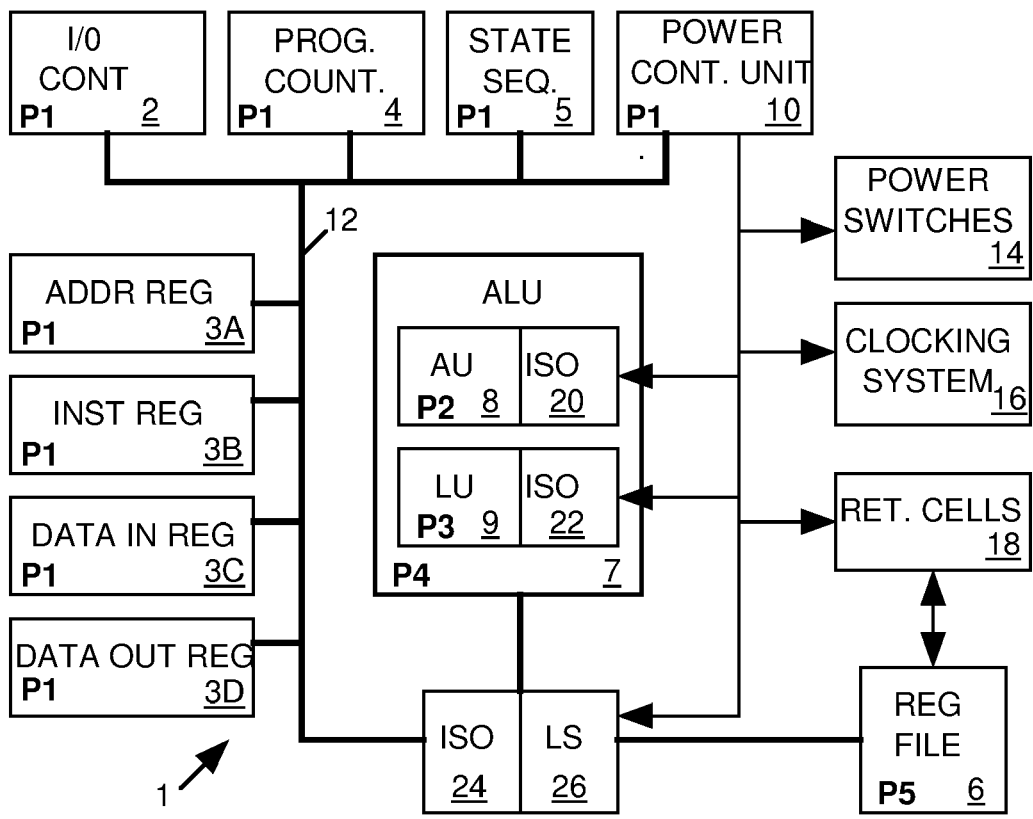
FIG. 1 is a block diagram depicting a prior art integrated circuit.
FIG. 2 is a table depicting a prior art power intent design of the integrated circuit of FIG. 1

An IC design may include a power management system to help the IC conserve power. FIG. 1 is a block diagram of an example RISC processor IC 1 including an I/O controller 2, a set of data, address and instruction registers 3A-3D, a program counter 4, a state sequencer 5, a register file unit 6 and an arithmetic logic unit (ALU) 7 and a power control unit 10 that communicate through a bus 12. ALU 7 includes an arithmetic unit (AU) 8 and a logical unit (LU) 9. A set of power switches 14 couple the devices to various power sources and a clocking system 16 supplies clock signals to the various devices for controlling their frequency of operation. As discussed below, power control unit 10 controls various power management features of IC 1.

Power Domains, Power Gating

A "power domain" (also known as a "power island") is a set of devices within an IC that receive power from a common source. An IC may have more than one power domain, and some of the power domains may be gated. The supply to a "gated" power domain can be temporarily turned off when devices within that domain are not needed. An IC that selectively turns on and off gated power domains is said to engage in "power gating" or "power shutoff" (PSO). In the example of FIG. 1, IC 1 includes a set of five power domains P1-P5 (also known as "power islands"), each having its own primary power supply connected though separate power switch 14 controlled by power control unit 10. The power to domain P1 is always on, but power domains P2-P5 are gated through power switches 14 so that power control unit 10 can turn them off to save power when state sequencer 5 tells power control unit 10 that devices in those domains are to be inactive and can turn them back on when state sequencer 5 tells power control unit 10 that those devices are to be active.

Multi-Voltage and Multi-Frequency Domains

Since both the speed and power consumption of a circuit device increase with its supply voltage, it is possible to reduce the power consumption of devices that can operate more slowly by reducing their supply voltages. In a multi-voltage IC, not all power domains operate at the same supply voltage. Thus in a multi-voltage IC, each device resides not only in a particular power domain based on the source of its power supply, but also in a particular "voltage domain" based on the voltage of its supply. Devices that must operate at high frequency are assigned to higher voltage domains while devices that may operate at lower frequency are assigned to lower voltage domains. In the example IC of FIG. 1, domains P1-P4 normally operate at 5.0V whereas domain P5 operates at 3.6V.

An IC employing "Dynamic Voltage and Frequency Scaling (DVFS)", also known simply as "Dynamic Voltage Scaling (DVS)", can temporarily reduce the voltage and frequency of devices to save power during times when the devices need not operate at high speed. For example, power control unit 10 of FIG. 1 reduces power consumption by signaling power switches 14 and clocking system 16 to reduce the voltage and frequency operation of devices within power domain P1 when they can operate at low speed and otherwise increases the voltage and frequency of operation of those devices when they can operate at high speed.

Power Intent

The strategy that an IC uses to reduce power consumption is called its "power intent". FIG. 2 depicts the power intent of the IC 1 design with respect to supply voltage. In the example of FIG. 2, IC1 is depicted as having four power modes of operation PM1-PM4. State sequencer 5 selects the current power mode based on the current demands on the processor. In power mode PM1, power is supplied to all power domains P1-P5, each power domain P1-P4 is connected to a 5.0 v supply while domain P5 is connected to a 3.6 v supply. In power mode PM2 the supply to power domain P1 is reduced to 3.6 v and the supply to power domain P2 is turned off. In power mode PM3, the supplies to power domains P3 and P4 are also turned off. In power mode PM4, the supply to power domain P1 is reduced to 3.6 v and the supply to power domain P5 is turned off.

FIG. 2 shows that in addition to the five power domains, IC 1 has three voltage domains including an adjustable 3.6 v/5 v voltage domain for devices in power domain P1, a constant 5.0 v voltage domain for devices in power domains P2-P4, and a constant 3.6 v voltage domain for devices in power domain P5.

Retention Cells

When power control unit 10 turns off the supply to any of power domains P2-P5, it may be necessary to store data indicating current states of various signals produced or received by devices within the domain so that when power control unit 10 later restores power to that domain, those devices can resume operation from the states they had before the power was turned off. "Retention cells" retain signal information that would otherwise be lost when a power domain's power supply is turned off and restore signals to their original states when the domain's power is turned back on. In the example of FIG. 1, a set of low-power, low speed retention cells 18 store some of the data normally stored in higher-power, higher speed register file 6 when the power to register file 6 is turned off. When state sequencer 5 signals power unit 10 that the system is entering power mode PM4, the power control unit signals retention cells 18 to store the data currently in register files. When state sequencer 5 later signals power control unit 10 that the system is leaving power mode PM4 and entering one of power modes PM1-PM3, power control unit 10 signals retention cells 18 to write that data back into register file 6. A data signal subject to retention is supplied as input to a retention cell, which also has a control signal input. When the control signal indicates that the value of the data signal is to be saved, the retention cell stores the current value of the data signal. The retention cell normally drives its output signal to the value indicated by its input data signal. However when the control signal indicates the data signal is to be "restored", the retention cell drives its output signal to the last stored value of the data signal.

Isolation Cells

A power gating domain may include "isolation cells" controlled by power control unit 10 for disconnecting output ports of various devices within the domain from other parts of the IC when the domain's power is off to prevent those output ports from providing floating inputs to other circuits that can produce unexpected behavior. For example, when power control unit 10 turns off AU 8 or LU 9 as the IC enters power mode PM3, it signals isolation cells 20 or 22 to isolate the outputs of AU 8 or LU9 from inputs of other devices within ALU 7 to prevent those inputs from being driven to unexpected states. Similarly a set of isolation cells 24 controlled by power control unit 10 can isolate outputs of ALU 7 or register file 6 from bus 12 during power mode PM3 or PM4 when ALU7 or register file 6 is off. A data signal subject to isolation is supplied as input to an isolation cell. The isolation cell also has a control signal input and a clamp signal input. The control signal input indicates whether the isolation cell is activated. When the control signal indicates isolation is "off", the isolation cell delivers the data signal to its output. When the control signal indicates isolation is "on", the isolation cell drives its output to the level of its clamp signal input.

Level-Shifting Cells

A multi-voltage IC employs a set of buffers ("level-shifting cells") to shift logic levels of signals crossing voltage domain boundaries. For example while ALU 7 of FIG. 1 operates at 5.0 v in power modes PM1 and PM4, it must communicate via bus 12 with devices of domains P1 and P5 that can operate at 3.6V. In order to allow ALU 7 to communicate with devices operating at the lower voltage, level shifting cells 26 are provided to appropriately shift signals on bus 12 between 3.6 and 5 volts as they pass between voltage domains. Since domain P1 can switch between 5 v operation in power mode PM1 and 3.6 v operation in power modes PM2-PM4, power control unit 10 tells level shifting cells 26 to adjust their level shifting behavior depending on whether the system is in power mode PM1 or one of power modes PM2-PM4.

Logic Simulation

Figure 3:
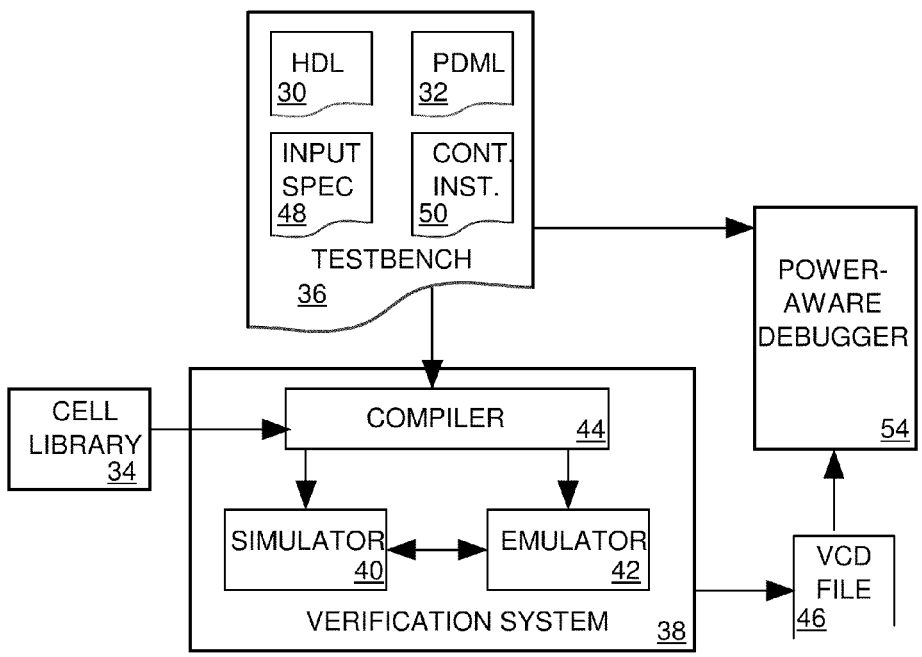
FIG. 3 is a block diagram of an IC design verification and debugging system in accordance with the invention.

Referring to FIG. 3, an IC designer generates an RTL or gate level IC design in the form of a conventional hardware description language (HDL) data file 30. The designer can also create a Power Definition Markup Language (PDML) file 32 specifying the IC's power-intent. PDML file 32 provides a high-level abstract model of the IC's power intent at the RTL level of the design. At the gate level of the design, HDL file 30 describes the IC as including instances of standard cells specified in a cell library 34 and PDML file 32 correlates specified power intent behavior to cell instances referenced by HDL file 30.

To verify that the IC described by HDL file 30 and PDML file 32 will behave as expected, the designer creates a testbench file 36 and supplies it, along with cell library 34, as inputs to a verification system 38 including a logic simulator 40 and possibly an emulator 42. A compiler 44 within verification system 38 compiles test bench 36 and cell behavioral models contained in cell library 34 into programs for simulator 40 and emulator 42 enabling them to simulate the response of the IC to a set of input signals and to produce a value change data (VCD) file 46 containing data indicating how selected IC signals behaved during the logic simulation. Testbench file 36, based on HDL file 30 and PDML file 32, also includes a specification 48 of the behavior of the IC's input signals during the logic simulation and instructions 50 for controlling various aspects of the logic simulation.

Dynamic Power-Aware Debugging

The invention relates to a "power-aware debugger" 54 for processing the data in VCD file 46, HDL file 30 and PDML file 32 to produce various displays as discussed below that help the designer to determine whether the simulated IC signals represented by the data in VCD file 46 behaved as expected, and to determine which portions of the HDL and PDML designs led to any unexpected signal behavior.

Module Browser Window

Figure 4:
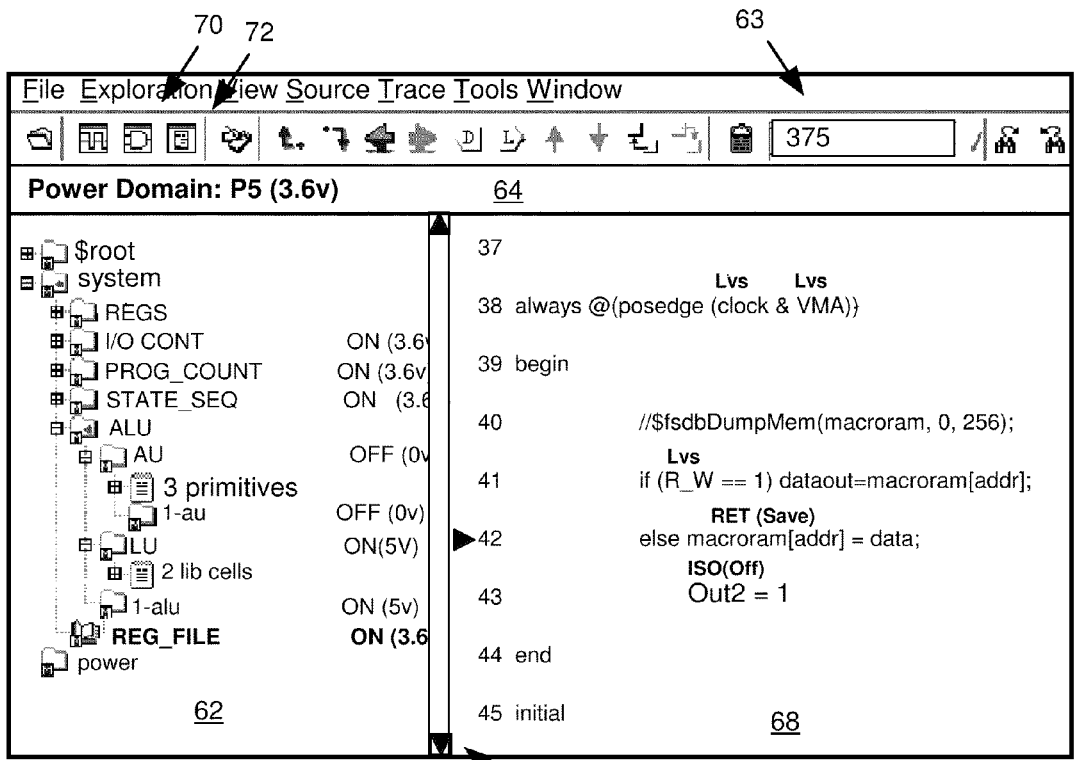

FIG. 4 depicts one of the displays debugger 54 generates, a browser 60 that enables a user to view the HDL source code in HDL file 30 of FIG. 3. HDL source code typically organizes a circuit design into a hierarchy of modules. Browser 60 includes a module browser window 62 employing a graphical tree to represent the design hierarchy. Each folder icon represents a module of the IC, and each page icon represents one or more instances of standard cells ("primitives") described in cell library 34. The folder with an open-book icon indicates that the module is currently displayed in the code browser window 68. Debugger 54 annotates each folder icon with the name of its corresponding module. For example, in FIG. 4, module browser window 62 shows that the "ALU" module is formed by a set of three lower-level modules "AU", "LU" and "1-alu" and that the AU module is formed by three primitives and a lower-level module "1-au".

A box 63 indicates a current user-selected simulation time. Since at any time during the logic simulation, the supply to a power domain will be either on or off, debugger 54 annotates icons in module browser window 62 representing modules residing in switchable power domains with "ON" or "OFF" to indicate the on/off power states of the modules at the currently selected simulation time and with the current voltage level supplied to that module. In the example of FIG. 4, the power to the AU module is OFF and at 0 volts while the power to the LU module is on and set at 5 v.

When the user uses a mouse click to select an icon in module browser window 62, debugger 54 highlights the module's name and annotations and displays the name, current On/Off state and current supply voltage of its power domain in a power information bar 64. In the example of FIG. 4, the user has selected a "REG_FILE" module which resides in a power domain P5 having a 3.6 v power supply that is currently on.

Code Browser Window

When a user selects an icon representing a module defined by a block of HDL code in HDL file 30, debugger 54 displays the HDL code in code browser window 68, In the example of FIG. 4, code browser window 68 currently displays lines 37-45 of the code implementing the currently selected REG_FILE module. A scroll bar 66 enables the user to scroll through the code. In accordance with the invention, debugger 54 annotates references in the HDL code to signals or data subject to level-shifting, retention, and isolation. For example, debugger 54 annotates references in code browser window 68 to signals, such as the clock, VMA and R_W signals, requiring level shifting through a level shifting cell with the symbol "Lvs".

Debugger 54 annotates references in code browser window 68 to signals whose values are stored in retention cells during power off conditions with one of symbols "RET", "RET (Save)", or "RET(Restore)". The "RET" symbol indicates the signal is subject to retention but that the state of the signal is controlled by the HDL logic at the currently selected simulation time. The "RET(Save)" symbol indicates the state of the signal is controlled by HDL logic but is being saved in a retention cell during the current logic simulation cycle in anticipation of the module's power being turned off during a next logic simulation cycle. The "RET (Restore)" symbol indicates that the state of the signal was saved in a retention cell at an earlier time and is being restored to that state during the current logic simulation cycle. In the example of FIG. 4, the annotation RET(Save) indicates data conveyed by the macroram[addr] bus is currently being saved in a retention cell in anticipation of turning off the power supply to the P5 power domain of the REG_FILE Debugger 54 annotates references in code browser window 68 to signals such as the Out2 signal that are subject to isolation via an isolation cell with one of symbols "ISO(On)" or "ISO(Off)". The ISO(On) symbol indicates that the annotated signal is isolated from receiving device input ports as of the current user-selected simulation time, while the ISO(Off) symbol indicates that the signal is not currently isolated from receiving device input ports. In the example of FIG. 4 the ISO(Off) annotation indicates that the OUT2 signal passes through an isolation cell but is not currently isolated.

Dynamic Power-Intent Annotation of Netlist Schema

When the user mouse clicks a button 70 of the browser window 60 of FIG. 4, debugger 54 displays a pop-up window containing a schematic diagram (a "netlist-schema") of the currently selected module of the netlist as illustrated, for example in FIG. 5. The netlist-schema graphically depicts the various component instances of the module and the nets that interconnect them. In accordance with the invention, debugger 54 annotates each instance's power-domain and on/off/voltage status. For example, in the display of FIG. 5, debugger 54 indicates that the ALU module is formed by a set of interconnected modules 1-alu, AU and LU. The display further indicates that the 1-alu module resides in power domain P4, that its voltage supply is on, and set at 5V, that the AU module resided is power domain P2, which is off (at 0 volts), and that the LU module resides in power domain P3, which is on and at 5 v. Furthermore, in FIG. 5, the module blocks and signals are set to different colors to represent their power domains.

System Power State Table

When the user mouse clicks a button 72 of browser 60 of FIG. 4, debugger 54 displays a system power state table 80 as illustrated in FIG. 6 in a pop-up window. Power state table 80 indicates the currently selected simulation time in a cell 82. The cells of row 83 indicate the power domains P1-P5 and the name vdd1-vdd5 of the power supply signal for each power domain and the cells of column 84 indicate the four power states PM1-PM4. Each cell residing at the intersection of a power mode row and a power domain column indicates the voltage and state of the power supply for that power domain. For example cell 86 indicates that when the IC is in power mode PM4, the voltage of power supply signal vdd1 for power domain P1 is 3.6V and cell 88 indicates that the power supply signal vdd5 for power domain P5 is off. The row of cells for the power mode PM2 currently in effect at time 365 ns is highlighted (in bold face).

When debugger 54 responds to a user request to display system power state table 80, it determines whether the voltage or on/off state of each supply voltages vdd1-vdd5 at the indicated simulation time matches the voltage or state specified in the PDML file 32. If debugger 54 finds that one or more of supply voltages vdd1-vdd5 is of an incorrect voltage or on/off state, it displays an "illegal power state" warning message in a pop-up window, as illustrated in FIG. 7. It also displays both the current state and expected state of the supply voltage in the appropriate cell in state table 80 and flashes the cell to attract the user's attention. In the example of FIG. 6, the vdd4 supply to power domain P4 is currently OFF even though the PM2 power mode requires it to be at 5V.

Power-Aware Incremental Driver Tracing

When a user determines that an IC signal had an unexpected state at some time during a logic simulation, a conventional debugger will help the user determine the logic that caused that unexpected state by displaying a schematic diagram depicting the fan-in cone of the signal. The fan-in cone of a signal is the set of circuit devices that can have a logical effect on the state of the signal. When implementing "incremental driver tracing" the debugger initially displays the schematic only of the module instance that generates the signal and then adds schematics of other module instances to the fan-in cone schematic in response to user input.

Figure 8:
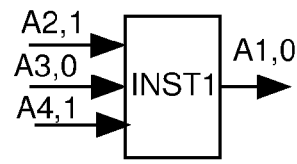
FIGS. 8-10 depict incremental driver tracing displays produced by a prior art debugger.

For example referring to FIG. 8, a user wanting to know why a signal A1 is of a particular state at a particular time may select the signal and request an "incremental driver trace" for that signal. A conventional debugger will then produce a schematic diagram, for example as shown in FIG. 8, including a schematic diagram of the module instance INST1 that produces that signal along with the input signals A2-A4 to that instance. The simulator sets a signal value to X (unknown) rather than to a value such as 0 or 1, when it cannot determine the signal's state. This can happen when logic fails to set the signal to a known value, or when power supply to a domain producing the signal is off, or when the signal is a logical result of another signal having an unknown value.

Figure 9:
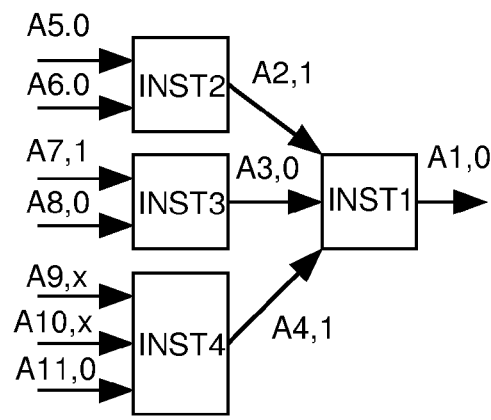
Figure 10:
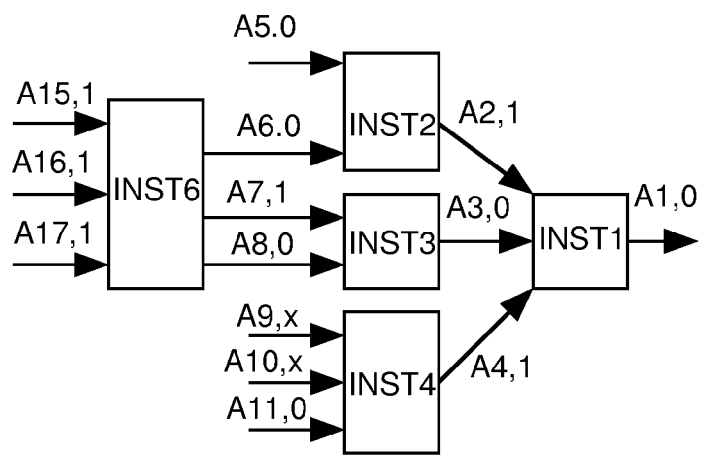

Although the debugger will display a detailed schematic diagram of the instance if available, for simplicity FIG. 8 depicts the schematic diagram only as a box. If the user wishes to view schematic diagrams of the sources of input signals A2-A4, the user can select those signals and request the debugger to update the display to include their source module instances INST2-INST4 and their input signals A5-A11 as illustrated in FIG. 9. If the user then wants the display to include the source module instance of signal A6, the user can select signal A6 and request the debugger to include that source instance INST6 as shown in FIG. 10.

Figure 11:
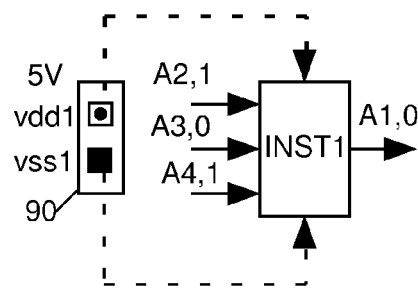
FIGS. 11-13 depict power-aware incremental driver tracing displays produced by a debugger in accordance with the invention.
Figure 12:
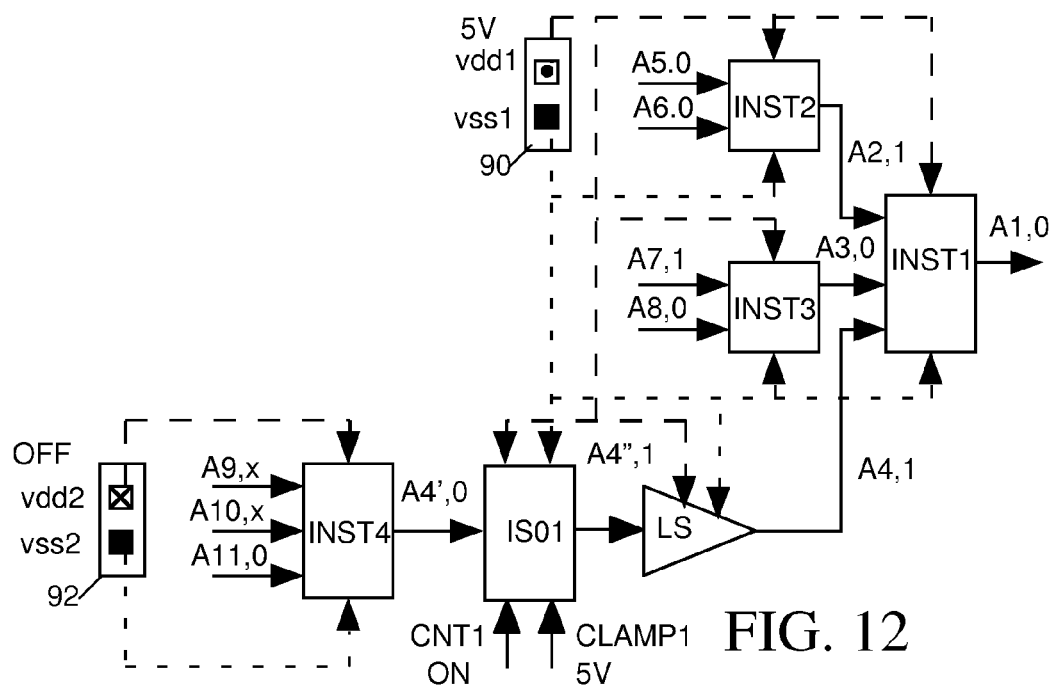

A debugger in accordance with the present invention improves the prior art incremental driver tracing debugging feature to provide incremental, "power-aware" driver tracing wherein the display depicts not only the data signal connectivity of the device and module instances within the fan-in cone of the selected signal defined by the HDL code but also the power connectivity of the fan-in cone introduced by the PDML code. For example, FIG. 11 shows a Power-Aware fan-in display that is similar to that of FIG. 8 except that it also includes a depiction of the power source 90 supplying the power signals vdd1 and vss1 to module instance INST1 with a graphic depiction of those power signals. The power supply signals vdd1 and vss1 are dashed or depicted in distinctive colors to distinguish them from data signals A1-A4. Power source 90 is annotated to indicate the current voltage (5V) of vdd1 at the currently selected simulation time. FIG. 12 shows an improved, power-aware, version of the fan-in cone of FIG. 9 including power source 90 supplying vdd1 and vss1 to instances INST1, INST2 and INST3, and a second power source 92 supplying vdd2 and vss2 to instance INST4. Power supply 92 is annotated as being OFF at the currently selected simulation time. The power-aware incremental driver trace of FIGS. 11 and 12 is advantageous over the prior art incremental driver trace of FIGS. 8 and 9, for example when the unexpected state of signal A1 arose because vdd2 was OFF and not because of any error in the logic of INST1-INST4.

Instances of isolation, retention and level shifting cells are included in the fan-in cone of a power-aware incremental driver trace. For example, as illustrated in FIG. 12, the fan-in cone depicts an isolation cell ISO1 in the A4 signal path and includes not only its input and output data signals A4' and A4", but also the name and ON/OFF state of the control signal CNT1 that determines whether the isolation cell is on (isolating) or off (not isolating) and the voltage of the clamp signal CLAMP1 controlling the logic state of the output A4" when isolation is on. When an instance of a level-shifting cell LS is included in a power-aware driver trace, the display includes its input and output data signals A4" and A4, and their states and the power supply signals.

Figure 13:
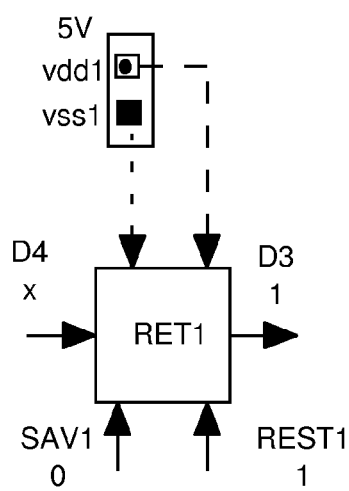

As illustrated in FIG. 13, when an instance of a retention cell RET1 is included in a power-aware driver trace, the display includes its input and output data signals D4 and D3, and their states and the power supply signals, the name and state of the control signal SAV1 that tells the retention cell when to save the state of its input signal D4 and the name and state of its restore signals REST1 that tells the retention cell whether it is to use its input signal D4 or its stored data to drive its output signal D3.

Power-Aware Active Driver Tracing

A conventional debugger implementing Incremental driver tracing determines which module instances are to be included in the fan-in cone of a selected signal only by analyzing the topology of the circuit described by the HDL code. For example in FIG. 9, a conventional debugger will include instance INST3 in the display when the user selects signal A3 simply because its output signal A3 is an input to INST1 and because INST1 generates the signal of interest A1. A conventional debugger can implement "active driver tracing", which is similar to incremental driver tracing described above, except that the debugger analyzes circuit logic to determine which signals may have contributed to the current state of the selected signal and highlights those signals.

Figure 14:
FIGS. 14 and 15 depict active driver tracing displays produced by a prior art debugger.
Figure 15:
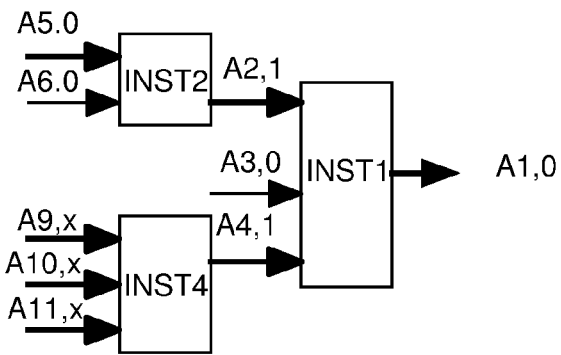

For example, as illustrated in FIG. 14, when a user selects signal A1 and requests an active driver trace, a conventional debugger will produced a fan-in display including the module instance INST1 that produced the A1 signal and the input signals A2-A4 to instance ISNT1. The debugger will analyze the logic of INST1 based on the HDL description of it to determine which of signals A2-A4 influenced the state of A1 and will highlight those signals. In the example of FIG. 14, the debugger determined that signals A2 and A4 affected the state of signal A1. The debugger can determine whether an input signal to a module instance can change the state of any output signal by changing the state of the input signal and, based on the instance's logic, determining whether the state of its output signal will change. The debugger determined that signal A3 was "inactive", in the sense that it had no influence on the state of signal A1 while signals A2 and A4 were active. With the active signals highlighted as in FIG. 14, the user need request an active incremental trace only of signals A2 and A4 as illustrated in FIG. 15 so that the fan-in display is not obscured by module instances such as instance INST3 of FIG. 9 whose output signal states are not relevant to the state of the selected signal A1 of interest.

Figure 16:
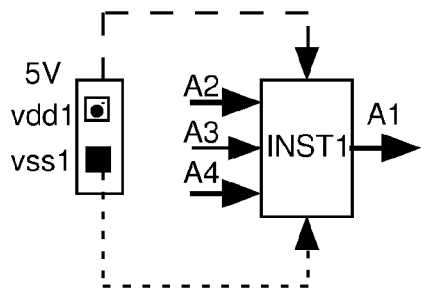
FIGS. 16 and 17 depict power-aware active driver tracing displays produced by a debugger in accordance with the invention.
Figure 17:
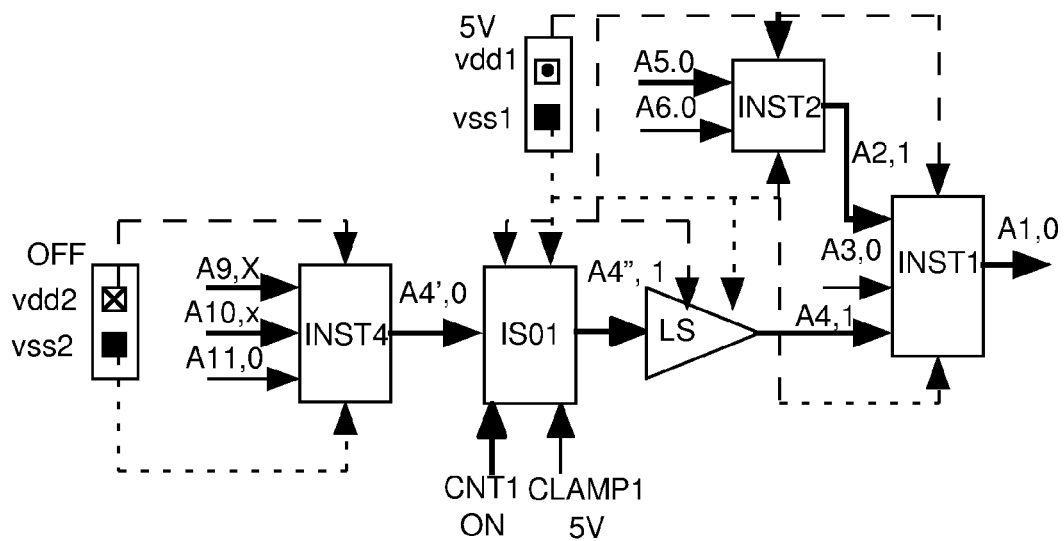

A debugger in accordance with the invention implements "power-aware active driver tracing" similar to conventional active driver tracing except that it includes the power connectivity of the fan-in cone introduced by the PDML code. For example the prior art active driver trace fan-in displays of FIGS. 14 and 15 are expanded as shown in FIGS. 16 and 17 to include the vdd1 and vdd2 power sources, the isolation cell ISO1 and the level-shifting cell LS. Power aware active driver tracing will highlight clamp signal, restore signal and unknown values caused by power shut-off. For example in FIG. 17, the CNT1 signal is highlighted because the debugger determined that the on/off state of the control signal could affect the state of active signal A4".

Automated Power-Aware Active Driver Tracing

As discussed above, when a conventional debugger operates in the active driver trace mode, the fan-in display initially includes only the instance that produced the selected signal of interest as shown, for example, in FIG. 14. The debugger then incrementally expands the fan-in display, for example as shown in FIG. 15, whenever the user selects a signal in the current fan-in display and requests an incremental trace of that signal.

Figure 18:
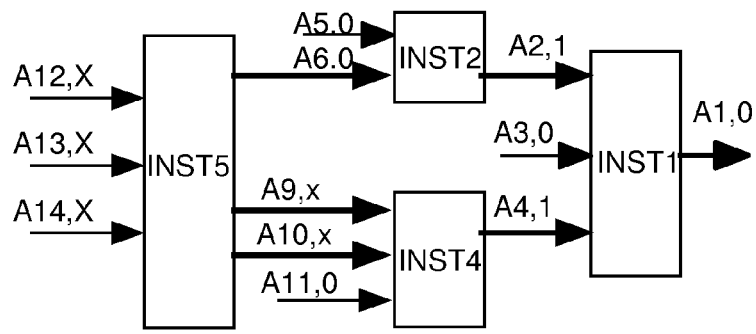
FIG. 18 depicts an automated active driver tracing display produced by a prior art debugger.

Referring to FIG. 18, when a conventional debugger operates in an "automated active driver tracing" mode, the initial fan-in display will automatically include all module instances INST1-INST5 that could have affected the selected signal A1 because the debugger automatically carries out an incremental trace of all active signals.

Figure 19:
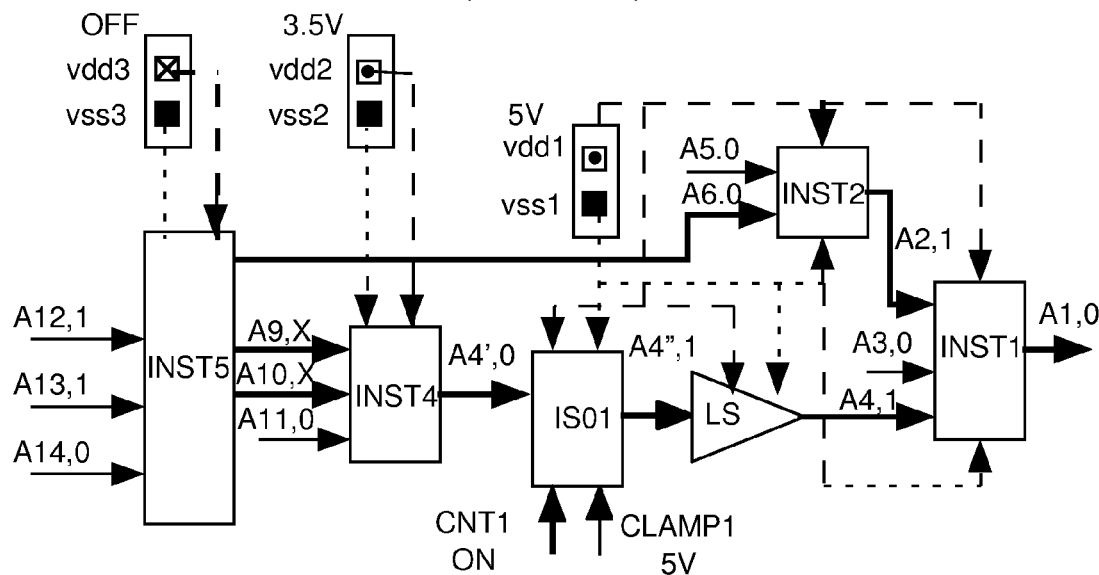
FIG. 19 depicts an automated power-aware active driver tracing display produced by debugger in accordance with the invention.

Referring to FIG. 19, a debugger in accordance with the invention includes an "automated power-aware active driver tracing" mode that is similar to the conventional automated active driver tracing mode but which expands the fan-in cone to include the power connectivity introduced by the PDML code. For example as shown in FIG. 19, the fan-in cone includes the power sources vdd1, vdd2 and vdd3, isolation and level shifting cells ISO1 and LS.

Automated Power-Aware X-Source Tracing

A debugger in accordance with the invention provides an "automated power-aware X-source tracing" mode in which it generates a fan-in display for a user-selected signal having an unknown value (X) that helps the user to determine whether the unknown value was caused by HDL logic or by PDML power-intent behavior. In this mode, the debugger will trace back signals having unknown values until it reaches any of the following stopping conditions:

1. An instance which gets power-shut-off (VDD==off || VSS==off).
2. A retention cell having a store-control is on, and stored value is unknown ("X.").
3. An isolation cell whose isolation-control is on, and whose clamp signal value is unknown.
4. An instance for which all input signals have known values.

Figure 20:
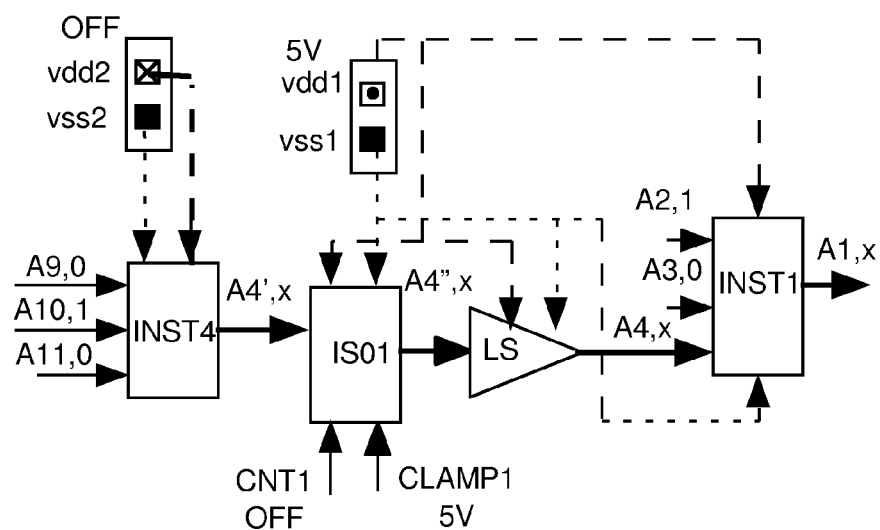
FIG. 20 depicts an automated power-aware X-source tracing display produced by debugger in accordance with the invention.

FIG. 20 shows an example of an automated power-aware X-source tracing display generated after a user selected the A1 signal at a simulation time in which the signal had an unknown value. This display enables the user to see that the A1 signal took on an unknown state because the vdd2 input to INST4 was off.

Thus has been shown and described a power-aware debugging system in accordance with the invention. While the foregoing specification and the drawings depict exemplary embodiments of the best mode(s) of practicing the invention, and elements or steps of the depicted best mode(s) exemplify the elements or steps of the invention as recited in the appended claims, the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

The invention claimed is:

1. A computer-readable storage device containing software which, when executed by a computer, causes the computer to carry out a method of processing an integrated circuit (IC) design and results of a logic simulation of a behavior of a simulated version of an IC based on the IC design, wherein the IC design includes a hardware description language (HDL) model of the IC describing the IC as comprising a plurality of cell instances communicating via data signals and power sources for supplying power to the cell instances, and a power definition markup language (PDML) model describing a power intent of the IC design, the method comprising steps of:

a. responding to a user input by generating a display representing a portion of the HDL model of the IC, and
  b. augmenting the display to indicate how the power intent of the IC design described by the PDML model relates to the portion of the HDL model represented by the display.

2. The computer-readable storage device in accordance with claim 1
  wherein the display depicts a portion of HDL code of the HDL model and includes code referencing data signals whose values during the logic simulation are influenced by the power intent described by the PDML model, and
  wherein step b comprises annotating the portion of the HDL code depicted in the display that references a data signal having a value influenced by the power intent to indicate how the value of the data signal is influenced by the power intent described by the PDML model.

3. The computer-readable storage device in accordance with claim 2
  wherein the HDL code depicted in the display includes a reference to a data signal that the PDML model indicates is subject to level-shifting, and
  wherein the reference to that data signal is annotated at step b to indicate that the data signal is subject to level-shifting.

4. The computer-readable storage device in accordance with claim 2
  wherein the user input indicates a particular simulation time during the logic simulation,
  wherein the HDL code depicted in the display includes a reference to a data signal that the PDML model indicates is subject to retention by a retention cell instance, and
  wherein the reference to that data signal is annotated at step b to indicate that the data signal is subject to retention and to indicate whether that data signal was saved or restored by the retention cell instance at the particular simulation time.

5. The computer-readable storage device in accordance with claim 2
  wherein the user input selects a particular simulation time during the logic simulation,
  wherein the HDL code depicted in the display includes a reference to a data signal that the PDML model indicates is subject to isolation by an isolation cell instance, and
  wherein the reference to that data signal is annotated at step b to indicate that the data signal is subject to isolation and to indicate whether that data signal was isolated by the isolation cell instance at the particular simulation time.

6. The computer-readable storage device in accordance with claim 1
wherein the user input selects a particular simulation time during the logic simulation,
wherein the PDML model indicates at least one of the power sources can be turned on and off during IC operation,
wherein the display includes representations of cell instances forming the represented portion of the IC and the power sources that supply power to the cell instances represented, including a representation of at least one of the power sources that can be turned on or off during IC operation, and
wherein each representation of the power source that can be turned on or off during IC operation is annotated at step b to indicate whether it was on or off at the particular simulation time.

7. The computer-readable storage device in accordance with claim 1
wherein the user input selects a particular simulation time during the logic simulation,
wherein the PDML model indicates at least one of the power sources has an output voltage that can vary during IC operation,
wherein the display includes representations of cell instances forming the represented portion of the IC and the power sources that supply power to the the cell instances represented, including a representation of at least one of the power sources has an output voltage that can vary during IC operation, and
wherein each representation of a power source having an output voltage that can vary during IC operation is annotated at step b to indicate a magnitude of the output voltage at the particular simulation time.

8. The computer-readable storage device in accordance with claim 1
wherein the user input selects a particular data signal of the IC and selects a particular simulation time during the logic simulation;
wherein step a comprises responding to the user input by processing the HDL model to determine a particular portion of the IC that generated the particular data signal,
wherein the display generated at step a comprises a trace display including representations of cell instances included within the particular portion of the IC, representations of data signals transmitted and received by the cell instances represented in the trace display, a representation of each power source supplying power signals to any cell instance represented in the trace display, and representations of the power signals, and
wherein the representations of data signals and the representations of the power signals in the trace display are annotated to indicate their values at the particular simulation time.

9. The computer-readable storage device in accordance with claim 8
wherein the PDML model describes at least one power source represented in the trace display as capable of being turned on and off during IC operation, and
wherein the representation of the at least one power source in the trace display is annotated at step b to indicate whether the at least one power source was on or off at the particular simulation time.

10. The computer-readable storage device in accordance with claim 9
wherein the particular data signal has an unknown value at the particular simulation time, and
wherein an automatic trace operation is performed at step a to determine which cell instances could have caused the particular data signal to have the unknown value at the particular simulation time, thereby to determine which cell instances are to be represented in the display.

11. The computer-readable storage device in accordance with claim 10
wherein the display identifies a representation of a power signal that was turned off at the particular simulation time input as being a cause of the particular data signal having an unknown value at the particular simulation time.

12. The computer-readable storage device in accordance with claim 8
wherein the PDML model describes at least one power source represented in the trace display as being able to produce a power signal having a voltage that can vary in magnitude during IC operation, and
wherein the display is annotated at step b to indicate the magnitude of the voltage of the power signal at the particular simulation time.

13. The computer-readable storage device in accordance with claim 8
wherein the PDML describes at least one data signal represented in the trace display as being subject to retention by a retention cell instance,
wherein the trace display includes a representation of the retention cell instance as receiving the at least one of the data signal and as receiving a control signal for selecting a mode of operation of the retention cell instance, and
wherein the trace display is annotated at step b to indicate the mode of operation of the retention cell instance at the particular simulation time.

14. The computer-readable storage device in accordance with claim 8
wherein the PDML describes at least one of the data signals as being subject to isolation by an isolation cell instance,
wherein the trace display includes a representation of the isolation cell instance as receiving the at least one data signal and as receiving a control signal for selecting a mode of operation of the isolation cell instance, and
wherein the trace display is annotated at step b to indicate the mode of operation of the isolation cell instance at the particular simulation time.

15. The computer-readable storage device in accordance with claim 14
wherein the trace display also represents the isolation cell instance as atse receiving a clamp signal for controlling a voltage of an output signal of the isolation cell instance when the isolation cell instance is operating in an isolating mode of operation, and
wherein the display is annotated at step b to indicate a voltage of the clamp signal at the particular simulation time.

16. The computer-readable storage device in accordance with claim 8
wherein the trace display visually distinguishes displayed representations of data signals for which a change in data signal value would affect a value of the particular data signal at the particular simulation time from displayed representations of other data signals, and
wherein the trace display visually distinguishes displayed representations of power signals for which a change in on or off state would affect a value of the particular data signal at the particular simulation time from displayed representations of other power signals.

17. The computer-readable storage device in accordance with claim 8
wherein an automatic trace operation is performed at step a to determine which cell instances affect state of the particular data signal at the particular simulation time, thereby to determine which cell instances are to be represented in the display.

18. The computer-readable storage device in accordance with claim 17
wherein the PDML model describes at least one of the data signals as being subject to isolation,
wherein one of the cell instances in the display is an isolation cell instance depicted as receiving a clamp signal input having an unknown voltage magnitude at the particular simulation time, and
wherein the display identifies the clamp signal input as being a cause of the particular data signal having an unknown value at the particular simulation time.

19. The computer-readable storage device in accordance with claim 1
wherein the PDML model describes a set of legal power intent states of the IC,
wherein the display lists the legal power intent states described by the PDML model,
wherein the display indicates in which one of the legal power intent states, if any, the results of the logic simulation indicate the simulated version of the IC operated at the particular simulation time, and
wherein the display provides a warning if the results of the logic simulation indicate the simulated version of the IC was operating in an illegal power intent state at the particular simulation time.

* * * * *